United States Patent
O'Boyle et al.

[11] 3,742,274
[45] June 26, 1973

[54] NEUTRON DETECTOR

[75] Inventors: Martin J. O'Boyle, Export; Richard J. Nodvik, Pittsburgh, both of Pa.

[73] Assignee: Westinghouse Electric Corporation, Pittsburgh, Pa.

[22] Filed: Feb. 4, 1971

[21] Appl. No.: 112,658

[52] U.S. Cl.................................. 313/61, 250/83.1
[51] Int. Cl...................................................... H05h
[58] Field of Search...................... 313/61; 250/83.1

[56] References Cited
UNITED STATES PATENTS
2,845,560  7/1958  Curtis et al. ...................... 313/61 R
3,043,954  7/1962  Boyd et al. ...................... 313/61 R X FOREIGN PATENTS OR APPLICATIONS
938,594    10/1963  Great Britain..................... 250/83.1
1,187,886  4/1970   Great Britain..................... 250/83.1

OTHER PUBLICATIONS

"Nuclear Safeguards Research and Development," Los Alamos Scientific Laboratory, Program Status Report July–September 1969, pages 20–22

Primary Examiner—Roy Lake
Assistant Examiner—James B. Mullins
Attorney—A. T. Stratton and Z. L. Dermer

[57] ABSTRACT

The employment of the isotope Pu–238, or its target material NP–237 in conjunction with Pu–238, is disclosed herein in combination with other fertile, fissile, and fissionable isotopes as an economically feasible regenerative material for use in detectors of the neutron detector type; more particularly, for use in miniature fixed in-core fission chambers, to extend the operating lifetime of the chamber.

4 Claims, 4 Drawing Figures

PATENTED JUN 26 1973

WITNESSES
Theodore F. Wrobel
Daniel C. Abeles

INVENTORS
Martin J. O'Boyle
and Richard J. Nodvik
BY
ATTORNEY

NEUTRON DETECTOR

BACKGROUND OF THE INVENTION

This invention pertains in general to neutron detectors and more particularly to detectors that employ a new regenerative coating therein.

Present day neutron detectors of the miniature fission chamber variety employ highly enriched uranium (greater than 90 a/o U–235) as the neutron sensitive material. The U–235 depletes rapidly, significantly limiting the operating lifetime of the detector when retained within the core of a nuclear reactor as a fixed flux monitor.

The use of a regenerative fertile fissile isotope combination in the coatings of fission chambers in lieu of U–235 alone will extend their operating lifetime appreciably. Experimental work in this area is underway on isotope combinations that employ either U–234 or U–238 as the fertile isotope. The U–234/U–235 regenerative coating has cost and availability disadvantages. More particularly, a gram of U–234 costs about $23,000 (each detector uses about 5 milligrams), and it is not known at the present whether sufficient quantities of U–234 are available to meet projected requirements.

A U–235/U–238 regenerative coating is also possible. While it is economically attractive, it has many shortcomings. There is a delay in the formation of Pu–239 which affects transient response, and the signal level is so low for acceptable U–235/U–238 regenerative blends, that the detector requires an AC readout, which in turn necessitates the use of specially developed quartz cable, very short signal cable runs (less than 40 feet), and complicated Campbelling-type signal processing techniques.

In order to achieve a useful operating life in excess of about $7 \times 10^{21}$ nvt of thermal energy neutrons at an ambient temperature of up to 650° F for fixed in-core fission chambers, a detector employing a regenerative coating must be used. The regenerative material must be readily available both for near term and long term needs, it must be economic from the standpoint of detector cost, and it must provide the desired performance characteristics. The aforementioned regenerative materials do not satisfy this criteria.

SUMMARY OF THE INVENTION

Pu–238 in combination with other fertile, fissile, and fissionable isotopes comprises a means for achieving a highly effective and economically acceptable regenerative coating for neutron detectors.

One embodiment of this invention comprises a detector of the fission chamber type having a regenerative coating of Pu–238, or its target material Np–237 in conjunction with Pu–238, as a fertile isotope in combination with other fertile, fissile, or fissionable isotopes. More particularly such a detector may comprise a miniature in-core fission chamber for nuclear reactors employing such coatings.

BRIEF DESCRIPTION OF THE DRAWINGS

For a better understanding of the invention, reference may be had to the preferred embodiment, exemplary of the invention, shown in the accompanying drawings in which.

DESCRIPTION OF THE PREFERRED EMBODIMENTS

Figure 1:
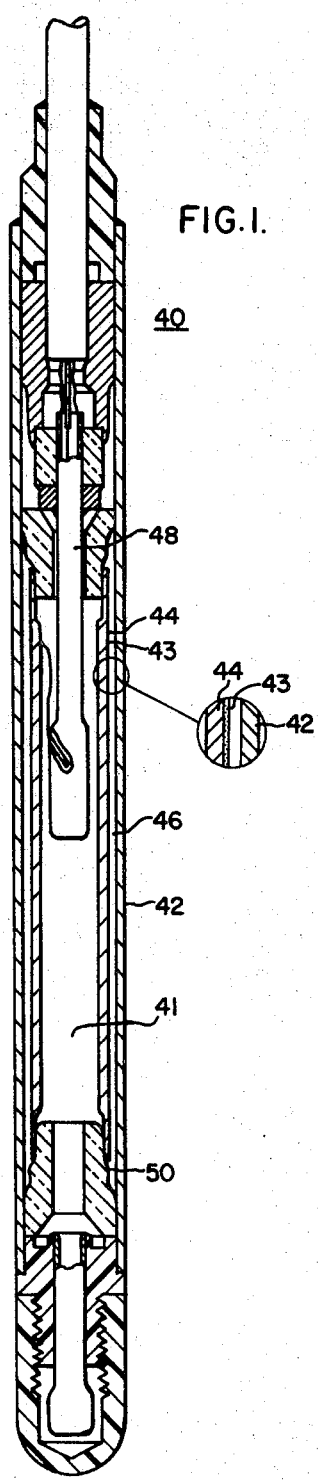
FIG. 1 is a longitudinal sectional view of a fission chamber assembly and is illustrative of the operation of such an assembly.

Detectors of the fission chamber type are generally used for monitoring the neutron flux throughout a nuclear chain reacting assembly. Such a chamber 40 is illustrated in FIG. 1 and comprises a sealed vessel 41, containing at least two spaced electrodes 42 and 44. The electrodes 42 and 44 are maintained in insulated relationship with one another by insulator 50 and in this example the center electrode is electrically connected to an electrical conductor 48 which runs axially through the chamber 40 to an outside potential source not shown. An ionizable gas 46 such as hydrogen argon or helium is disposed in the space between the electrodes 42 and 44. A thin film 43 of a fissionable material is conventionally located on the surface of one of the electrodes. In this example the film 43 is coated on the outside diameter of electrode 44. Highly enriched uranium (greater than 90 a/o U–235) has been principally used for this purpose. The fissionable material may be deposited on either electrode, 42 or 44, by electroplating, sputtering in a high vacuum, or the like. The exposure of this fissionable material to a neutron flux induces nuclear fission of the uranium in proportion to the flux. The resultant high energy neutrons and fission products enter the ionizable gas 46 adjacent the electrodes 42 and 44 creating gas ions and permitting a proportional current to flow through the chamber 40. The chamber 40 operating in conjunction with means for applying a potential between the electrodes 42 and 44 such as a voltage supply, and means for measuring current flow through the chamber 40, such as an ammeter, as it varies with the intensity of ionization comprises the basic instrument for monitoring neutron flux in a nuclear reactor.

The present day miniature fission chambers employing highly enriched uranium (greater than 90 a/o U–235) as the neutron sensitive material have a very limited operating life. The U–235 depletes rapidly, significantly limiting the operating lifetime of these detectors when they are retained in the core of a nuclear reactor as fixed flux monitors.

In order to achieve a useful operating life in excess of about $7 \times 10^{21}$ nvt (time integrated neutron flux at thermal energy levels at 650° F ambient) for fixed in-core fission chambers, a regenerative coating of some type must be used in place of the highly enriched uranium. The regenerative material must be readily available both for near and long term needs, it must be economical from the standpoint of detector cost, and it must provide the desired performance characteristics.

In accordance with this invention Pu–238 is employed in combination with other fertile, fissile and fissionable isotopes, to achieve a highly effective and economical regenerative coatings.

Instead of Pu–238 alone, its target material Np–237 in conjunction with Pu–238 can be employed as the fertile isotope in combination with other fertile, fissile, or fissionable isotopes to form the regenerative coating for neutron detectors.

Figure 2:
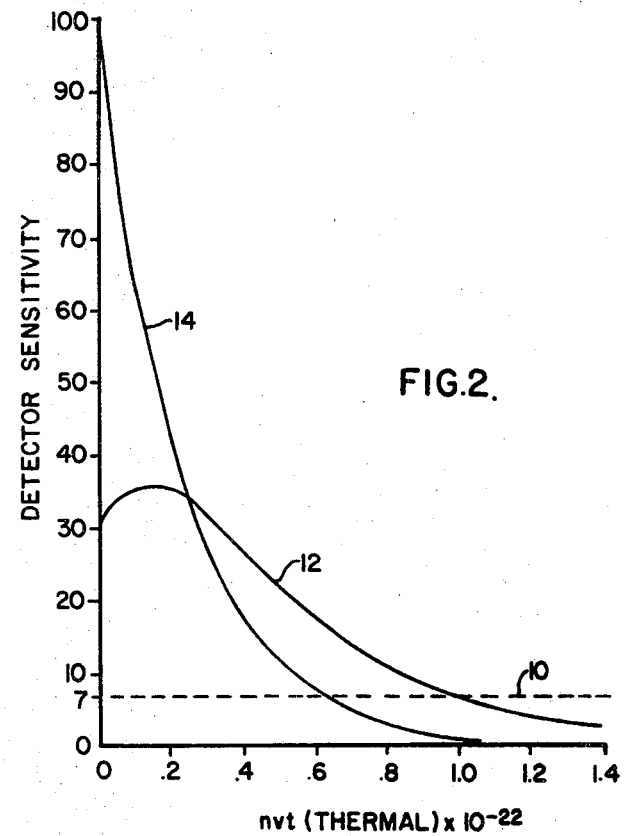
FIG. 2 is a linear graphical representation of detector sensitivity versus nvt (neutron fluence) for various regenerative coating combinations.

The suitability of Pu–238 as a fertile material in regenerative coatings for in-core fission chambers is demonstrated in FIG. 2 which illustrates on a linear graph the calculated detector sensitivity versus nvt for a 90 a/o Pu–238 and a 10 a/o Pu–239 combination. This curve is defined by reference character 12. Detector sensitivity versus nvt for a 100 a/o U–235 coating is also shown in FIG. 2 as a reference and is defined by reference character 14. Thus, it can be seen from FIG. 2, though the initial detector sensitivity of the Pu–238-/Pu–239 combination is not as great as the U–235 coating, it is still well above the presently accepted minimum neutron sensitivity which defines end of life for the detector, represented by the dotted abscissa 10, and the Pu–238/Pu–239 combination has a greatly increased detector lifetime.

Figure 3:
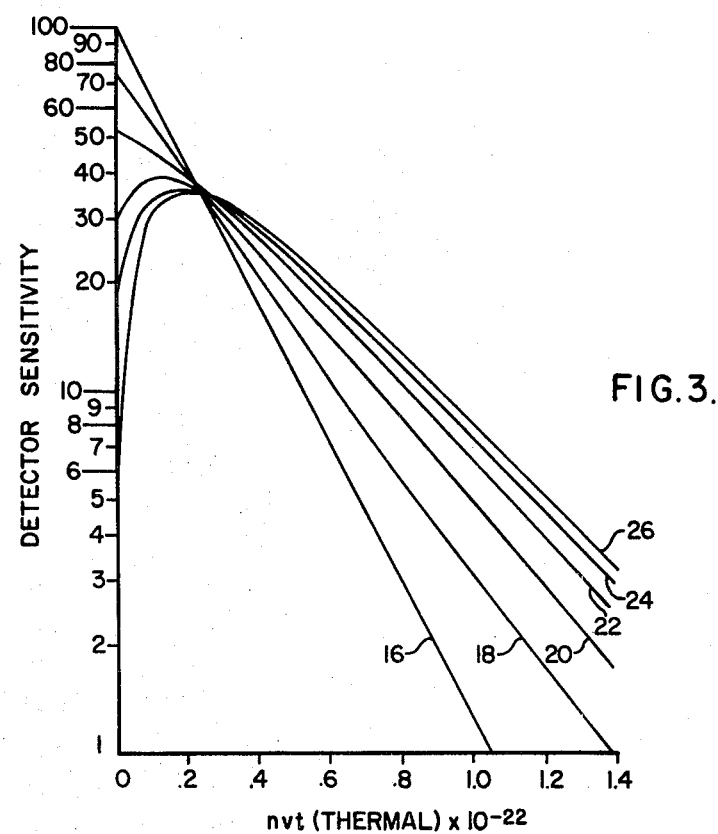
FIG. 3 is a semi-log graphical representation of detector sensitivity versus nvt for various blends of regenerative coatings.
Figure 4:
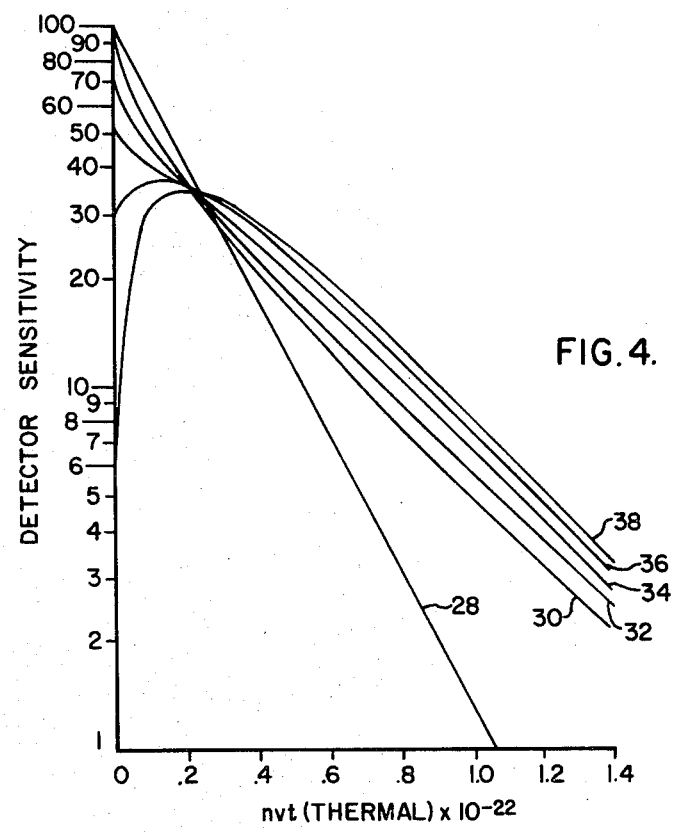
FIG. 4 is a semi-log graphical representation of detector sensitivity versus nvt for various other blends of regenerative coatings.

There are a myriad of combinations of Pu–238 and other fertile, fissile and fissionable isotopes which could be considered to achieve optimum performance characteristics. FIGS. 3 and 4 show on a semi-log graph, for information, the performance characteristics of various U–235/Pu–238 and Pu–239/Pu–238 blends. FIG. 2 shows the detector sensitivity versus nvt for various blends of Pu–238 and U–235: curve 16 represents a 100 a/o U–235 and a zero a/o Pu–238 combination; curve 18 represents a 75 a/o Pu–238 and a 25 a/o combination; curve 20 represents a 50 a/o U–235 and a 50 a/o Pu–238 combination; curve 22 represents a 25 a/o U–235 and a 75 a/o Pu–238 combination; curve 24 represents a 10 a/o U–235 and a 90 a/o Pu–238 combination; and curve 26 represents a zero a/o U–235 and a 100 a/o Pu–238 combination. It can be observed from FIG. 3 that the greater the concentration of Pu–238 in the coating the longer the lifetime of the detector. FIG. 4 shows the detector sensitivity versus nvt for various blends of Pu–238 and Pu–239. A 100 a/o U–235 curve is also shown for reference purposes and is defined by reference character 28. From the graph it can be seen that: curve 28 represents a 100 a/o U–235 and a zero a/o Pu–238 combination; curve 30 represents a 60 a/o Pu–238 and a 40 a/o Pu–239 combination; curve 32 represents a 70 a/o Pu–238 and a 30 a/o Pu–239 combination; curve 34 represents a 80 a/o Pu–238 and a 20 a/o Pu–239 combination; curve 36 represents a 90 a/o Pu–238 and a 10 a/o Pu–239 combination; and curve 38 represents a 100 a/o Pu–238 and a zero a/o Pu–239 combination. Again it can be seen from this graph that the greater the concentration of Pu–238 in the coating the longer the lifetime of the detector.

It is not important how the desired coating material is coated or applied, and standard coating techniques which are well known in the art such as electroplating, sputtering in a high vacuum, or the like can be used; or what other isotopes it is mixed with, as demonstrated by FIGS. 3 and 4; or how it is mixed. There are, accordingly, a multitude of alternatives available for mixing the disclosed fertile isotope with other isotopes and for loading the resulting regenerative material in the fission chamber.

We claim as our invention:

1. A neutron detector assembly comprising a sealed vessel having at least two spaced electrodes positioned therein, an ionizable gas disposed within the space between said electrodes, at least a portion of said assembly being formed at least in part from a regenerative material, and said regenerative material comprising Pu–238.

2. The neutron detector of claim 1 wherein said regenerative material comprises a mixture of Pu–238 and Np–237.

3. The neutron detector of claim 1 wherein said regenerative material comprises a mixture of Pu–238 and Pu–239.

4. The neutron detector of claim 1 wherein said regenerative material comprises a mixture of Pu–238 and U–235.

* * * * *